(12) United States Patent
Pires et al.

(10) Patent No.: US 9,090,120 B2
(45) Date of Patent: Jul. 28, 2015

(54) DECORATIVE GLAZING

(75) Inventors: Isabelle Pires, Thourotte (FR); Aurélien Gouy, Le Plessis Brion (FR); Isabelle Bernheim, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1010 days.

(21) Appl. No.: 12/808,295

(22) PCT Filed: Dec. 22, 2008

(86) PCT No.: PCT/FR2008/052397
§ 371 (c)(1),
(2), (4) Date: Jan. 14, 2011

(87) PCT Pub. No.: WO2009/081077
PCT Pub. Date: Jul. 2, 2009

(65) Prior Publication Data
US 2011/0096555 A1    Apr. 28, 2011

(30) Foreign Application Priority Data

Dec. 20, 2007   (FR) ..................... 07 60130

(51) Int. Cl.
| | | |
|---|---|---|
| *B32B 17/06* | (2006.01) | |
| *B32B 3/30* | (2006.01) | |
| *B32B 37/12* | (2006.01) | |
| *B44F 1/06* | (2006.01) | |
| *B32B 17/10* | (2006.01) | |

(52) U.S. Cl.
CPC ........... *B44F 1/066* (2013.01); *B32B 17/10036* (2013.01); *B32B 17/10174* (2013.01); *B32B 17/10247* (2013.01); *B32B 17/10761* (2013.01); *Y10T 428/24612* (2015.01); *Y10T 428/24868* (2015.01)

(58) Field of Classification Search
USPC ......................................... 428/437, 203, 172
See application file for complete search history.

(56) References Cited

U.S. PATENT DOCUMENTS

| | | | |
|---|---|---|---|
| 3,666,614 A | 5/1972 | Snedeker et al. | |
| 4,204,026 A | 5/1980 | Le Grand et al. | |
| 5,364,479 A * | 11/1994 | Boattini et al. | ............... 156/100 |
| 2005/0048229 A1* | 3/2005 | Elwakil et al. | ............. 428/32.18 |

FOREIGN PATENT DOCUMENTS

| | | |
|---|---|---|
| EP | 1 129 844 | 9/2001 |
| EP | 1 834 548 | 9/2007 |
| GB | 463 586 | 4/1937 |
| GB | 2 412 929 | 10/2005 |

(Continued)

OTHER PUBLICATIONS

Office Action issued Nov. 13, 2012 in JP Patent Application No. 2010-538879 with English Translation.

*Primary Examiner* — Maria Veronica Ewald
*Assistant Examiner* — Laura Auer
(74) *Attorney, Agent, or Firm* — Oblon, McClelland, Maier & Neustadt, L.L.P.

(57) ABSTRACT

The subject of the invention is laminated glazing comprising at least two glass sheets (1, 4) and at least one polymeric interlayer (2) made of polyvinyl butyral and binding said glass sheets together. The glazing is characterized in that at least one lacquer layer (3) is placed between the at least two glass sheets (1, 4).

17 Claims, 2 Drawing Sheets

(56) References Cited

FOREIGN PATENT DOCUMENTS

Figure 1:
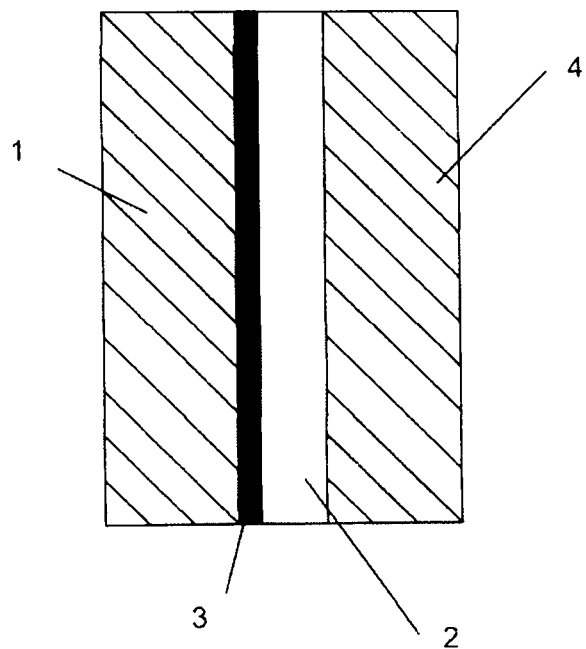

| JP | 51-164833 | 7/1986 |
| JP | 09-003393 | 1/1997 |
| JP | 2004-182487 | 7/2004 |
| JP | 2005-533737 | 11/2005 |
| WO | 2004/009349 | 1/2004 |
| WO | 2007104752 | 9/2007 |

* cited by examiner

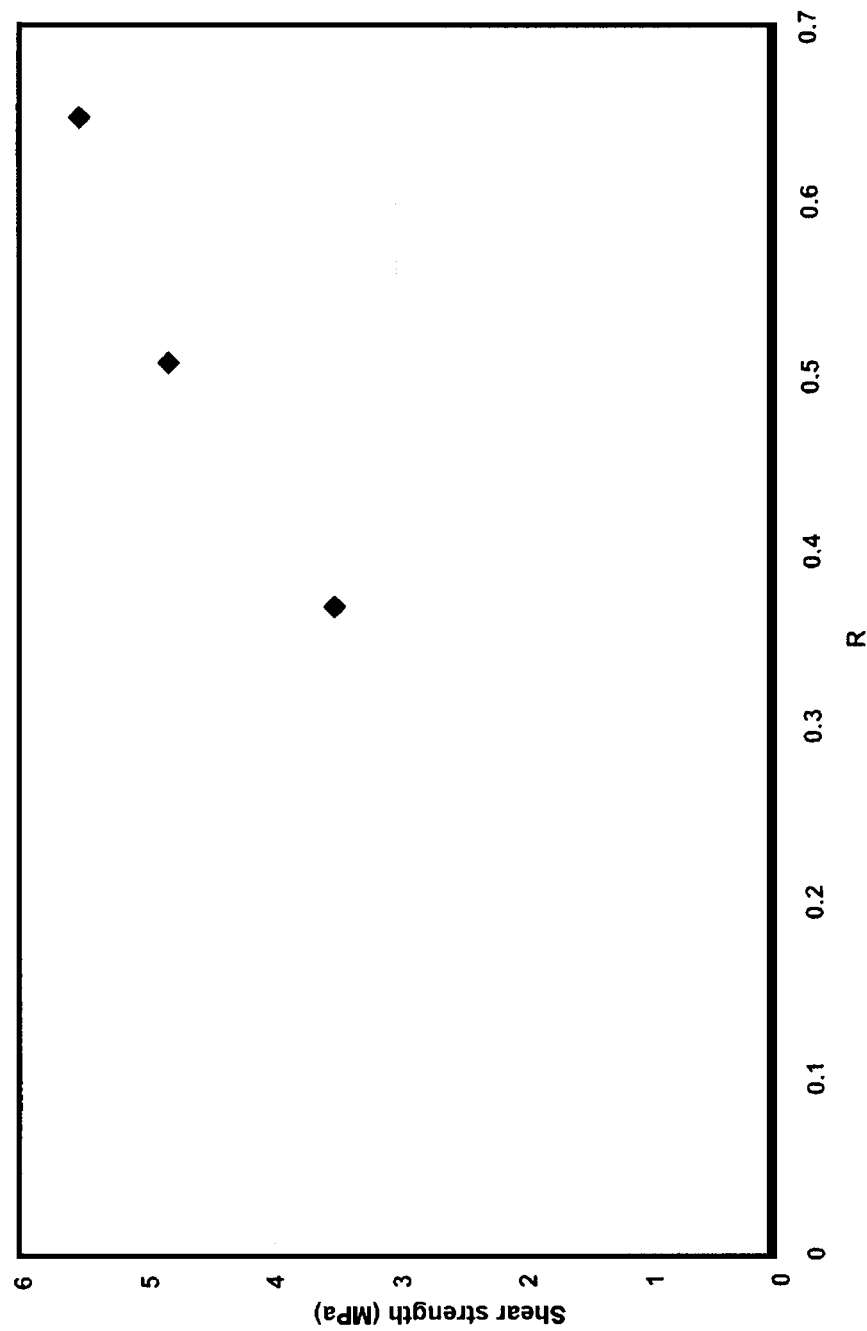

DECORATIVE GLAZING

CROSS REFERENCE TO RELATED APPLICATIONS

The present application is a 35 U.S.C. §371 national stage patent application of International patent application PCT/FR08/052397, filed on Dec. 22, 2008, the text of which is incorporated by reference, and claims the benefit of the filing date of French application no. FR 0760130, filed on Dec. 20, 2007, the text of which is incorporated by reference.

The present invention relates to decorative glazing, in particular intended for use as partition, furniture glazing, door, luminaire cover, ceiling, wall covering, balustrade, staircase step, shower door, etc.

It is known to coat glass sheets with films of lacquer for decorative purposes. A lacquer is a nontransparent coating, which may be translucent, but is in general opaque, and which comprises at least one polymeric resin, at least one pigment and generally mineral fillers. The polymeric resin serves to bind the pigments and the mineral fillers, whereas the purpose of the pigments is to give the desired color and opacity. The lacquered glass thus produced may be fastened to walls, for example by means of adhesives. However, for esthetic, durability, scratchability and safety reasons taken all together, this glazing cannot be employed as partitions or doors.

It is also possible to cover glass partitions using decorative films. However, the esthetic appearance and the durability are less satisfactory. Implementation, particularly film deposition, also poses problems, particularly in the case of large areas.

Patent application GB 463 586 describes various decorative glazing panels comprising two glass sheets and various decorations printed either on the glass or on membranes or fabric placed between the two glass sheets. However, these glazing panels are not capable of meeting the current standards in terms of safety, especially in terms of impact and shock resistance. Nor is the adhesion between the various elements optimized, thereby leading to problems of durability over time. The manufacturing methods are also complicated and expensive.

To obviate these drawbacks, one subject of the invention is laminated glazing comprising at least two glass sheets and at least one polymer interlayer made of polyvinyl butyral and bonding said glass sheets together, characterized in that at least one film of lacquer is placed between the at least two glass sheets.

Another subject of the invention is a method of obtaining glazing according to the invention, comprising the steps consisting in placing at least one polymer interlayer made of polyvinyl butyral between at least one glass sheet coated beforehand with a film of lacquer and at least one other glass sheet and then in subjecting the assembly to a thermocompression treatment so as to bond said glass sheets together.

It has proved to be the case that such assemblies can solve the aforementioned problems: the glazing obtained meets the standards in force in terms of shock and impact resistance and durability. In particular, it meets the requirements of standard EN 14449:2005, which defines the conformity of laminated glass, and is classified 2B2 according to the standard EN 12600, which defines the shock resistance of glazing. Thanks to these classifications, the decorative glazing according to the invention can be used as partitions, unlike the glazing of the prior art. This point is particularly surprising since, although lacquered glass on the one hand and laminated glass on the other have been known for many years, no-one would have imagined that it would be possible to laminate lacquered glass by means of PVB interlayers and therefore to solve the safety and esthetic problems inexpensively.

Advantageously, the or each film of lacquer is in contact with the or each polymer interlayer. The or each film of lacquer is preferably deposited in contact with a glass sheet.

The or each film of lacquer is preferably opaque and the or each polymer interlayer is preferably transparent.

The glazing according to the invention preferably consists of two glass sheets, a film of lacquer deposited on a first glass sheet and a polymer interlayer which is in contact with said film of lacquer and provides the bond between said first glass sheet and a second glass sheet.

However, other arrangements are possible, for example those comprising three glass sheets, two polymer interlayers being placed so as to bond the three glass sheets together, a lacquer film being placed on one of the glass sheets, in contact with one of the interlayers. The glazing according to the invention may also consist of two glass sheets each covered with a film of lacquer and with a polymer interlayer located between these lacquered glass sheets, thereby achieving two different esthetic appearances depending on the side of the partition.

Whatever the arrangement chosen, it is important in all cases that the lacquer film be within the glazing, and therefore not in contact with the outside, and that the glazing be laminated in the sense that the various glass sheets forming the glazing are bonded together by a PVB polymer interlayer. The esthetic, durability, scratchability and safety problems are thus solved.

In the rest of the text, the term "internal face" is understood to mean that face of a glass sheet facing another glass sheet of the glazing and the term "external face" is understood to mean that face on the outside of the glazing, and therefore in contact with the ambient air.

The or each polymer interlayer is preferably flexible so as to make it easier to manufacture the glazing according to the invention and to be able to meet the usual requirements in terms of shock and impact resistance.

The or each polymer interlayer is made of polyvinyl butyral (PVB), which has many advantages. PVB has a refractive index close to that of soda-lime-silica glass commonly employed for the production of glazing, so that the interlayer is invisible or almost invisible and does not conceal the lacquer film. It is thus possible to see the lacquer film from both sides of the glazing. PVB also allows shocks to be very effectively absorbed and enables glass fragments to be retained should the glazing break. In certain cases, as explained later in the text, PVB may also confer acoustic insulation properties.

The or each polymer interlayer preferably has a thickness of between 0.1 and 10 mm, particularly between 0.38 and 2.28 mm and especially between 0.38 and 0.76 mm, the thickness having an influence on the shock resistance. It is possible to obtain an interlayer thickness of 0.76 mm by superposing two interlayers each of 0.38 mm thickness.

The or each interlayer may have improved acoustic insulation properties, especially for protecting against solid-borne and/or aerodynamic noise. It may in this regard be chosen for meeting the requirements defined in one or more of the patent applications EP 0 100 701, EP 0 844 075 and EP 0 387 148. According to patent application EP 0 100 701, the interlayer is chosen such that a bar 9 cm in length and 3 cm in width, made of laminated glass comprising two glass sheets 4 mm in thickness joined together by a 2 mm thick interlayer has a critical frequency that differs by at most 35% from that of a glass bar having the same length, the same width and a thickness of 4 mm. The interlayer according to patent application EP 0 844 075 has a loss factor tan δ of greater than 0.6 and a shear modulus G' of less than $2 \cdot 10^7$ N/cm$^2$ within a temperature range between 10 and 60° C. and a frequency range between 50 and 10 000 Hz. The interlayer according to patent application EP 0 387 148 has a flexural damping factor $v=\Delta f/f_c$ of greater than 0.15, the measurement being carried out by exciting, via a shock, a bar 9 cm in length and 3 cm in width made of a laminated glass pane in which the interlayer is between two thick glass panes, each of 4 mm thickness, and by measuring the resonant frequency $f_c$ of the first mode and the width $\Delta f$ of the peak at an amplitude of $A/\sqrt{2}$, where A is the maximum amplitude at the frequency $f_c$ such that its acoustic damping index does not differ, for any frequency greater than 800 Hz, by more than 5 dB from a reference index that increases by 9 dB per octave up to 2000 Hz, and by 3 dB per octave at higher frequencies.

The or each interlayer is preferably transparent or translucent, but in no case is it opaque. A transparent interlayer is preferred as it allows the appearance of the lacquer to be fully appreciated. The interlayer may be colorless or colored (for example blue, red, green, gray, etc.). It may also be printed, for example with opaque or translucent colored patterns, so as to reproduce a decoration that will be superposed on the decoration created by the lacquer film.

A preferred assembly consists in using two PVB polymer interlayers, inserted between which is at least one polymer sheet (especially a PET (polyethylene terephthalate) sheet) on which a decoration is reproduced by printing. The three-dimensional appearance of this type of assembly makes it particularly attractive.

One important characteristic of the lacquer is its capability of adhering well to the polymer interlayer. The inventors have demonstrated that the adhesion must be high enough to prevent any delamination, but not too high in order for the glazing to be able to be suitably shock-absorbent.

For this purpose, it is preferable for the film of lacquer to have, at least on its surface, chemical functional groups capable of chemically reacting with hydroxyl and/or carbonyl functional groups. Preferably, the film of lacquer therefore has on its surface functional groups of the same type, i.e. hydroxyl and/or carbonyl groups.

The amount of hydroxyl groups on the surface is in particular a parameter capable of influencing this adhesion. Thus, a preferred lacquer is such that, by measurement using ATR (attenuated total reflection) infrared spectroscopy, the ratio of the areas of the absorption bands associated with the hydroxyl groups to the areas of the absorption bands associated with the alkyl or alkane groups is equal to or greater than 0.4, especially 0.5 or 0.6. Such a lacquer makes it possible to optimize adhesion to the PVB interlayer and, in particular, to obtain very high durability.

The surface tension of the lacquer is also an important parameter. To obtain optimum adhesion between the lacquer and the PVB polymer sheet, the film of lacquer preferably has a surface tension of between 30 and 70 N/mm$^2$, especially between 32 and 50 J/mm$^2$ The surface tension may be measured with the aid of test inks sold by Plasmatreat GmbH.

The contact angle between a drop of a plasticizer of said polymer interlayer (especially triethylene glycol di(2-ethyl hexanoate)) deposited on the lacquer preferably does not exceed 30°.

The roughness of the lacquer also proves to be a factor that influences the adhesion, but to a lesser extent than the presence of the aforementioned chemical functional groups or the surface tension. The lacquer therefore preferably has a roughness $R_z$ according to the NF EN ISO 4287:1998 standard of between 10 and 90 microns, especially between 45 and 70 microns. The measurement parameters are defined in the NF EN ISO 4288:1998 standard.

The lacquer of the glazing according to the invention includes, like any lacquer, a binder based on a polymeric synthetic resin.

Preferably, the binder is based on an acrylic resin, especially one crosslinked with melamine and/or an isocyanate. Such a binder adheres well to the PVB polymer interlayer, in particular thanks to the carbonyl and/or hydroxyl functional groups still available on the surface after the lacquer has cured. The acrylic resin also has very good hydrolysis resistance.

The binder may also be a polyurethane resin, obtained by crosslinking with an isocyanate or a polyisocyanate, hydroxylated resins, especially polyester or polyether resins, or preferably acrylic resins (or polyacrylates), which have high ultraviolet resistance. This particular combination makes it possible in particular to obtain low water permeability, good mechanical properties (for example in terms of scratch resistance) and high ultraviolet resistance.

The binder for the lacquer of the glazing according to the invention may also contain or be based on one or more alkyd resins obtained by chemical reaction between at least one polyol, at least one polyacid and at least one fatty acid or an oil. Preferably, these alkyds are short-oil alkyds, that is to say the weight content of oil or fatty acid in the resin preferably does not exceed 40%. The polyols may for example be glycerol compounds or pentaerythritol compounds. The polyacids may be based on phthalic anhydride. The oils may be drying oils (such as linseed oil and tung (China wood) oil), semi-drying oils (such as soya oil, tall oil, safflower and dehydrated castor oil) or else non-drying oils (such as coconut oil and castor oil). To improve their water resistance properties, the alkyd binders may also be modified by monomers, such as styrene, vinyltoluene or acrylates, or by phenolic or epoxy resins. Heat-induced crosslinking aminoplast alkyd resins are particularly advantageous binders for the lacquer of the coating according to the invention. Preferably, the crosslinking aminoplast resin is a urea-formaldehyde resin or a melamine-formaldehyde resin, which gives good water resistance, especially when said resin has a content of 20 to 30% by weight relative to the dry alkyd binder.

The lacquer may also include a binder based on a thermosetting acrylic resin, for example obtained by the crosslinking of a carboxylated acrylic resin by an epoxy resin, a phenol-formaldehyde resin or a melamine-formaldehyde resin or an isocyanate, or the crosslinking of an acrylic resin having carboxamide functional groups by an epoxy or alkyd binder, or else the crosslinking of an acrylic resin having epoxide functional groups by acids or polyamines.

Preferably, the lacquer has a water permeability at 25° C., expressed in $cm^3 \cdot cm \cdot cm^{-2} \cdot s^{-1} \cdot Pa^{-1}$ of less than $10^{-6}$, or even less than $5 \cdot 10^{-7}$, and especially less than $10^{-7}$.

This water impermeability makes the assembly more durable by preventing the migration of the plasticizers of the PVB to the surface of the glass, which may lead to lacquer debonding. Furthermore, PVB has the particular feature of absorbing water: in a wet environment (for example in a bathroom), the water contained in the PVB may cause debonding at the edges if the water permeability of the lacquer is too high.

To ensure perfect adhesion and mechanical strength, especially shear strength, over long periods, it is even preferable for the lacquer to have a water permeability at 25° C. of less than $10^{-8}$, or $10^{-8}$, and even $10^{-10}$ $cm^3 \cdot cm \cdot cm^{-2} \cdot s^{-1} \cdot Pa^{-1}$. Since the glazing according to the invention were in certain cases intended to be placed in rooms having a wet environment (for example in a bathroom), it is even preferable for the water permeability of the lacquer to be less than $10^{-11}$ or $10^{-12}$ and even $10^{-13}$ cm$^3$·cm·cm$^{-2}$·s$^{-1}$·Pa$^{-1}$.

The water permeability is defined as the amount of water vapor passing through a material (in cm$^3$) multiplied by the thickness of the material (in cm) divided by the product of the exposed area (in cm$^2$) multiplied by the exposure time (in seconds) and by the pressure difference (in pascals) between the two faces of the material. It may for example be measured by measuring the weight uptake of a lacquer film after being exposed in an environmental chamber having a controlled degree of humidity.

This quantity, in the case of a polymer, depends firstly on the chemical nature of the polymer and then on its morphology, which depends for example on the amount of crosslinking (for example via the amount of crosslinking agent and/or the crosslinking temperature), on the degree of crystallization and on any orientation of the molecules. It also depends, where appropriate, on the nature and the amount of mineral fillers.

The lacquer is therefore preferably in liquid form before deposition and suitable for being oven-dried. It has been observed that lacquers comprising binders dried at high temperature (above 50° C. or even 100° C.) quite generally have a lower permeability than binders dried in air at room temperature, probably due to crosslinking reactions, for example polycondensation reactions, that have proceeded further and that give rise to higher-density three-dimensional networks.

Preferably, an adhesion promoter is present, in the form of a film interposed between the film of lacquer and a glass sheet and/or between the film of lacquer and the polymer interlayer and/or dispersed in the lacquer. This film is preferably based on silanes, which prevent the risk of debonding, due to moisture and, where appropriate, help to improve the adhesion between the lacquer film and the polymer interlayer. Adhesion promoters for adhesion to glass, such as silanes, may also be dispersed within the lacquer.

The lacquer includes mineral and/or organic pigments, preferably mineral pigments, so as to confer the desired esthetic properties. These pigments are preferably ultraviolet-resistant and moisture-resistant. Among pigments employed within the context of the present invention are, for example, titanium oxides and zirconium oxides, optionally doped with transition metal ions, or else mixed oxides of the zircon (ZrSiO$_4$) type. Preferably, the pigments are free of heavy metals such as cadmium and lead. Preferably, the lacquer film is opaque.

The lacquer may also contain mineral fillers intended to optimize its physico-chemical parameters, for example its viscosity. The total content of mineral species (pigments and fillers), expressed as a percentage by weight relative to the solids content, of the lacquer is preferably between 40 and 70%, better still between 50 and 60%.

The lacquer of the glazing according to the invention may be deposited using any type of method known to those skilled in the art, such as curtain coating, air spraying, screen printing and roll coating. The screen printing method has the advantage of being able to coat only part of the substrate. The roll coating method consists in passing the substrate to be coated between two rolls, one of which (generally the upper roll) is coated with lacquer. For cost reasons, the method employed is preferably curtain coating, in which a flow of lacquer is created on a line approximately perpendicular to the line along which the glass substrates run, thus making it possible to coat the entire surface of said substrates. The lacquer flow rate and the substrate run speed are regulated so as to coat to the desired thickness (preferably 100 to 200 microns in the wet state). The substrate coated with the lacquer is then subjected to a heat treatment for curing the lacquer, and more precisely for removing the solvent and carrying out the reactions for polymerizing and/or crosslinking the resins employed as binder. The temperature employed is preferably between 50 and 250° C., especially between 100 and 200° C. so as to give the lacquer a degree of crosslinking capable of reducing its water permeability. The thickness of the lacquer film after curing is preferably between 20 and 100 microns, especially between 40 and 70 microns so as to obtain the desired opacity.

The or each glass sheet employed may be any type of flat glass (optionally, the glass is bent by bending processes known to those skilled in the art when curved surfaces have to be coated). The glazing may be a monolithic glass pane, i.e. consisting of a single glass sheet, which may be produced by the float process, enabling a perfectly plane and smooth sheet to be obtained, or produced by drawing or rolling processes. In the latter case, and when the rolling mill rolls have raised features, the glass sheet may be embossed and have patterns (for example as taught in the patent document EP 493 202) on at least one of its faces, preferably the face supporting the lacquer (or internal face).

The glass sheet may or may not be tempered. An untempered sheet has the advantage of being able to be cut.

The glass may be clear or tinted in various colors, such as blue, bronze, green, gray or even pink. The light transmission of the glass may be chosen to be between 10 and 92% for a 4 mm thickness. One particularly preferred embodiment, especially if the lacquer is white or very light in color, for example ivory, consists in using as glass substrate a sheet of extra-clear glass, i.e. a glass having an iron oxide content of less than 250 ppm, preferably not exceeding 200 ppm or even 150 ppm, and the light transmission of which, under illuminant D$_{65}$, is greater than 89%, especially 90%, for a 4 mm thickness. It has been found that the optical properties of such a glass make it possible to achieve excellent color rendition—white or ivory—of the lacquer, whereas the residual green tint of standard clear glass, the iron oxide content of which is of the order of 1000 ppm, is particularly in evidence.

Preferably, the thickness of the or each glass sheet is between 2 and 19 mm, preferably between 2 and 6 mm and more particularly between 2 and 5 mm. Glass sheets with a thickness of about 3 mm or 4 mm are preferred, especially in assemblies in which each glass sheet has the same thickness.

The or each glass sheet may be frosted on at least one of the faces (preferably the external face) by various frosting methods, for example hydrofluoric acid frosting or sandblasting. This frosting may be carried out over the entire face or over particular zones, thus creating slightly hollow frosted patterns. The latter embodiment may be implemented by protecting the zones that will not be etched by an acid-resistant coating, which will subsequently be removed. The frosted appearance may also be obtained by depositing an organic or mineral enamel.

A reflecting film, preferably a silver film, especially one obtained by silvering processes known to those skilled in the art, may also be interposed between the or each glass sheet (optionally provided with silane-type adhesion promoters) and the lacquer film, the latter then fulfilling the varnish function protecting the silver film from corrosion. Thus it is possible to obtain a partition having on one side the appearance of a mirror and on the other side the appearance of a lacquered glass.

A decoration in one or more colors, obtained by screen or inkjet printing, is advantageously interposed between the or each glass sheet (optionally provided with silane-type adhesion promoters) and the lacquer and/or on the external face. For example, it is possible to combine the application of decorations on the internal face with those on the external face.

The or each glass sheet may also be coated with functional films, such as multilayer stacks of antireflection films, films having a self-cleaning functionality (for example containing titanium oxide preferably crystallized in anatase and/or rutile form, which also has antisoiling, antibacterial, antifogging and anticondensation properties), or else hydrophobic films. Films conferring nonslip properties, especially in an enamel form, after particularly appreciated in the case of floor coverings. Abrasion-resistant or scratch-resistant films may also coat the or each glass sheet of the glazing according to the invention. The or each glass sheet may also be coated with at least one semireflecting film, the color then having a slightly metalized appearance.

Electrically conductive films, which therefore provide Joule (resistance) heating, may be incorporated on one of the faces of the glazing, thereby making it possible, for example, to obtain heated floors and/or walls. The interlayer may also include liquid crystals capable of orienting under the action of an electric field, enabling the glazing to switch from a translucent or opaque state to a transparent state and possibly, for example, revealing a particular decoration on the rear face.

Light-emitting diodes may also be placed between the polymer interlayer and at least one of the glass sheets of the glazing.

Another subject of the invention is a method of obtaining glazing according to the invention, comprising the steps consisting in placing at least one polymer interlayer between at least one glass sheet coated beforehand with a film of lacquer and at least one other glass sheet and then in subjecting the assembly to a thermocompression treatment so as to bond said glass sheets together. The heat treatment is typically carried out according to methods known to those skilled in the art for laminating glass, in an autoclave, at a pressure of between 9 and 14 bar and at a temperature between 100 and 150° C. The method is less expensive and more easily implemented than those described in the prior art, since it is unnecessary to modify the parameters customarily used for laminating glass, in which two uncoated glass sheets are laminated by means of PVB.

To optimize the adhesion between the lacquer film and the polymer interlayer, the lacquer film is preferably subjected to the action of a plasma, especially by a corona discharge treatment, before the heat treatment. For the same purpose, it is also possible to deposit silanes on the lacquer film, for example by spraying them or applying them using a rag. These treatments make it possible to use lacquers that naturally have low adhesion to polymer interlayers. However, they incur an additional cost, and therefore are not preferred.

Yet another subject of the invention is a partition, door (framed or not), furniture glazing, ceiling, balustrade, luminaire cover, wall covering or staircase step, which incorporates glazing according to the invention. The partition may be a fixed partition or in the form of sliding panels, for example mounted on rails. The door may be an interior door or an exterior door, or else a shower door.

The present invention will be better understood on reading the following detailed description of nonlimiting exemplary embodiments illustrated by the appended figures.

FIG. 1 shows schematically glazing according to the invention, consisting of a first glass sheet 1 coated with a film of lacquer 3 and a second glass sheet 4, the assembly being joined together by a PVB interlayer 2.

Figure 2:
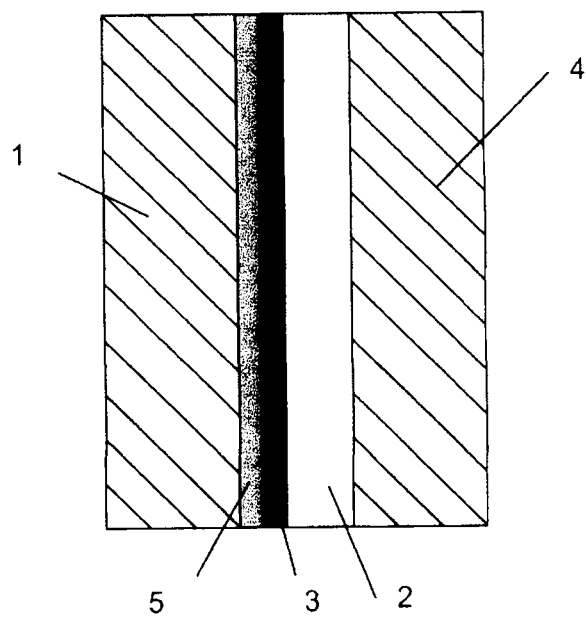

FIG. 2 shows schematically glazing according to the invention which is identical to that of FIG. 1 except that a silver reflecting film 5 is deposited between the glass sheet 1 and the lacquer film 3.

FIG. 3 shows, for lacquers that include acrylic or polyurethane binders, the relationship between, on the one hand, the ratio denoted "R" of the area of the absorption bands associated with the hydroxyl groups to the area of the absorption bands associated with the alkyl or alkane groups and, on the other hand, the shear strength (in MPa), which characterizes the adhesion between the lacquer and the PVB. Lacquers having on the surface a higher density of hydroxyl groups are the most satisfactory in terms of adhesion—these therefore have the lowest risk of delamination.

The glass sheets 1 and 4 are made of flat and untempered, monolithic clear soda-lime-silica glass, having a thickness of 4 mm. Such sheets are for example sold under the brand name SGG Planilux® by the Applicant. The internal face of the glass sheet 1 has been coated beforehand with a 50 micron thick film of lacquer 3 deposited using the curtain coating method.

The film of lacquer 3 comprised, after drying, the following ingredients:
 a binder in the form of a thermosetting acrylic resin crosslinked with melamine (resin A) or with an isocyanate (resin B);
 mineral materials (pigments and fillers) having a content of between 40 and 70% by weight relative to the solids content.

The lacquer film 3 obtained using resin A has a surface tension of around 36 to 38 $J/mm^2$ and a roughness $R_z$ of about 55 microns. In the case of resin B, the values obtained were around 42 to 48 $J/mm^2$ in the case of the surface tension and about 50 microns in the case of the roughness $R_z$. The surface tension was measured with the aid of test inks sold by Plasmatreat GmbH. By ATR infrared spectroscopy, the ratio of the area of the absorption bands associated with the hydroxyl groups to the area of the absorption bands associated with the alkyl or alkane groups is greater than 0.6, testifying to a high density of hydroxyl groups on the surface of the lacquer.

The interlayer 2 was made of a colorless transparent PVB 0.76 mm in thickness, sold under the reference Saflex RB41 by Solutia. The lamination was carried out using the techniques widely employed in the field: the two glass sheets 1 and 4 were joined together with the PVB interlayer 2 placed between said glass sheets. Any air contained between the constituent sheets of the glazing was then removed, for example by calendering and/or by applying a vacuum. The bonding was then carried out in an autoclave, under a pressure of about 12 bar, at a temperature of about 140° C.

The glazing can be used as a partition, since it meets the various existing standards. It is in particular classified as 2B2 according to the EN 12600 (shock resistance) standard and meets the requirements of the EN14449:2005 (conformity of laminated glass) standard.

The adhesion between the PVB and the glass sheets is characterized by a torsion measurement, as described in patent application WO 03/087785. The shear strength (before dissociation between the PVB and the glass sheet coated with the lacquer film is initiated) is very satisfactory, since it is between 4 and 6 MPa.

For another film of lacquer 3, having a ratio R of the area of the absorption bands associated with the hydroxyl groups to the area of the absorption bands associated with the alkyl or alkane groups of around 0.3, testifying to the lower density of hydroxyl groups on the surface, the adhesion is less good, since the shear strength is 1.5 MPa. Such adhesion is liable, under certain extreme conditions, to give rise to durability problems, especially due to delamination.

The glazing according to the invention also withstands high temperatures according to the EN 12543-4 standard since, after treatment at 100° C. for 2 hours, no defect (of the bubble, opacification or delamination type) is observed on the PVB, and no point of debonding or color change is observed on the lacquer.

Likewise, no such defects are observed after the moisture test according to the EN 12543-4 standard (50° C. water trickling for 14 days) or after the UV ageing test according to the EN 12543-4 standard.

The invention claimed is:

1. A laminated glazing assembly consisting of:
   a first glass sheet;
   a second glass sheet;
   a film of lacquer deposited on the first glass sheet;
   a polymer interlayer, which is in contact with the film of lacquer and provides the bond between the first glass sheet and the second glass sheet; and
   an adhesion promoter, which is present in the form of a film interposed between the film of lacquer and a glass sheet or dispersed in the lacquer,
   wherein the lacquer has a ratio of areas of the absorption bands associated with hydroxyl groups to areas of absorption bands associated with alkyl or alkane groups, R, of equal to or greater than 0.4 when the ratio is measured by an ATR infrared spectroscopy.

2. The glazing assembly as claimed in claim 1, wherein the film of lacquer is opaque and the polymer interlayer is transparent.

3. The glazing assembly as claimed in claim 1, wherein the film of lacquer has, at least on a surface of the film, chemical functional groups capable of chemically reacting with at least one of hydroxyl and carbonyl functional groups.

4. The glazing assembly as claimed in claim 1, wherein the film of lacquer has an $R_z$ roughness of between 10 and 90 microns measured according to the norm NF EN ISO 4287: 1998.

5. The glazing assembly as claimed in claim 1, wherein the film of lacquer has a surface tension of between 30 and 70 J/mm$^2$.

6. The glazing assembly as claimed in claim 1, wherein the lacquer comprises an acrylic-resin-based binder, said lacquer being in particular crosslinked with at least one of melamine and an isocyanate.

7. The glazing assembly as claimed in claim 1, wherein the lacquer has a water permeability of less than $10^{-6}$ cm$^3$·cm·cm$^{-2}$·s$^{-1}$·Pa$^{-1}$.

8. The glazing assembly as claimed in claim 1, wherein the film of lacquer comprises pigments resistant to at least one of ultraviolet radiation and mineral fillers in a content of between 40 and 70%.

9. The glazing assembly as claimed in claim 1, wherein at least one of the glass sheets has, on at least one of faces of the glass sheet, raised features obtained by at least one of rolling, acid frosting, sandblasting and etching, or wherein an entire external face of the at least one of the glass sheets is frosted by hydrochloric acid or by sandblasting.

10. A method for obtaining the glazing assembly as claimed in claim 1 comprising placing at least one polymer interlayer between at least one glass sheet coated with a film of lacquer and at least one other glass sheet to form an assembly and then subjecting the assembly to a thermocompression treatment so as to bond said glass sheets together.

11. The method as claimed in claim 10, comprising subjecting the film of lacquer to a plasma treatment, before the thermocompression treatment.

12. A partition, door, furniture glazing, ceiling, balustrade, luminaire cover, wall covering or staircase step comprising the glazing assembly as claimed in claim 1.

13. The glazing assembly as claimed in claim 1, wherein the lacquer comprises a binder comprising an acrylic resin crosslinked with melamine.

14. The glazing assembly as claimed in claim 1, wherein the lacquer comprises a binder comprising an acrylic resin crosslinked with an isocyanate.

15. The glazing assembly as claimed in claim 1, wherein the ratio R, determined by ATR infrared spectroscopy, of the lacquer is greater than or equal to 0.5.

16. The glazing assembly as claimed in claim 1, wherein the ratio R, determined by ATR infrared spectroscopy, of the lacquer is greater than or equal to 0.6.

17. The glazing assembly as claimed in claim 1, wherein the adhesion promoter is dispersed in the lacquer.

* * * * *